(12) United States Patent
Sei

(10) Patent No.: US 6,396,588 B1
(45) Date of Patent: May 28, 2002

(54) HYBRID CURVATURE-TILT WAVE FRONT SENSOR

(75) Inventor: Alain Sei, Pasadena, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/413,584

(22) Filed: Oct. 6, 1999

(51) Int. Cl.[7] .............................. G01B 11/02; G01J 1/20
(52) U.S. Cl. ..................................... 356/512; 250/201.9
(58) Field of Search ...................... 250/201.9; 356/5.1, 356/363, 371, 121, 512, 508, 510

(56) References Cited

U.S. PATENT DOCUMENTS 5,825,476 A  * 10/1998  Abitol et al. ................ 356/124
5,936,720 A  *  8/1999  Neal et al. ................... 356/121
6,163,381 A  * 12/2000  Davies et al.

OTHER PUBLICATIONS

Francois Roddier, Curvature Sensing and Compensation: A New Concept in Adaptive Optics, Applied Optics, Apr. 1998, vol. 27, No. 7, pp. 1223–1225.

David L. Fried, Least–Square Fitting a Wave–Front Distortion Estimate to an Array of Phase–Difference Measurements, J. Opt. Soc., Mar. 1997, vol. 67, No. 3, pp. 370–375.

* cited by examiner

Primary Examiner—Stephen C. Buczinski
(74) Attorney, Agent, or Firm—Harness, Dickey & Pierce, P.L.C.

(57) ABSTRACT

A hybrid curvature/tilt wave front sensor (50) that employs both tilt measurements and curvature measurements of the wave front of a light beam (16). The light beam (16) is split into a first path and a second path. The light beam (16) on the first path is directed to a tilt sensor (12) employing a lenslet array (24) having a plurality of lenses (26). The lenses (26) focus separate portions (32) of the wave front onto a CCD (28) that provides local intensity measurements. A computer (30) receives electrical information of the intensity of the various beam portions (32) and computes a tilt measurement based on this information. The light beam (16) on the second path is directed to a curvature sensor (14) that includes a pair of CCDs (40, 42) positioned at the same distance before and after the focal plane of a lens (52). The intensity measurement of the beam (16) at these locations is sent to the computer (30) which performs curvature measurements on the beam wave front. Algorithms are employed to determine the phase of the wave front based on the tilt and curvature measurements.

20 Claims, 2 Drawing Sheets

HYBRID CURVATURE-TILT WAVE FRONT SENSOR

BACKGROUND OF THE INVENTION

1. Field of the Invention

This invention relates generally to a wave front sensor, and more particularly, to a wave front sensor that employs a hybrid combination of a tilt sensor and a curvature sensor to provide an enhanced reconstruction of the phase of the wave front.

2. Discussion of the Related Art

Light from a distant source is typically collimated when it reaches a detector that is being used to sense the light. However, the various beam wavelets at the beam wave front are usually not in temporal coherence, which causes blurriness and distortion of the light beam. In particular, there are phase differences across the wave front of the beam causing the distortion. For example, light from a star looks fuzzy or blurry when it reaches the Earth. Additionally, the optical systems used for optical sensing also cause distortion of the beam wave front. Therefore, wave front sensing has been employed to measure the phase difference across the wave front and improve the performance of optical systems by correcting the phase to reduce beam distortion. Wave front sensing is routinely used in astronomy applications, as well as other engineering disciplines, such as high energy lasers and space surveillance.

Two conventional techniques are known in the art for providing beam wave front sensing. One technique includes determining tilt or slope measurements of the beam wave front using Hartman-Schack sensors. The article Fried, David L., "Least-square fitting a wave-front distortion estimate to an array of phase-difference measurements," J. Opt. Soc. Am., Vol. 67, No. 3, March, 1977, pgs. 370–375 discusses one of the first known techniques for providing tilt measurements of a beam wave front. In one design, the light is directed through an array of lenslets that focus individual portions of the wave front in the direction determined by their slope. Algorithms are then employed that reconstruct the phase of the wave front by minimizing the least squares error between the observed phase gradient (tilt) and its computed value.

The other known technique for providing beam wave front sensing includes determining curvature measurements of the wave front using intensity sensors. The article Roddier, Francois, "Curvature Sensing and Compensation: A New Concept in Adaptive Optics," Applied Optics, Vol. 27, No. 7, Apr. 1, 1988, pgs. 1223–1225 is one of the original discussions on determining curvature measurements of a beam wave front. Curvature measurements are computed from differences and ratios of the measured intensities of the wave front. The phase is then recovered by solving Laplace's equation with the right hand side equal to the measured curvature.

Wave front sensing using tilt measurements or intensity measurements present different advantages and drawbacks in various situations. First, these techniques have different sensitivities to the spatial frequency of the phase to be recovered. For example, for correction through atmospheric turbulence with Kolmogorov statistics, the spectrum of the phase of the wave front behaves as k to the power $(-11/3)$, so that the tilt of the phase of the wave front has a spectrum in k to the power $(-5/3)$ and the curvature of the phase has a spectrum in k to the power of $(1/3)$. Therefore, the measured tilts are highly correlated and very sensitive to low spatial frequencies. On the other hand, curvature measurements are weakly correlated, especially at low frequencies.

Second, these techniques have a different behavior of the mean-square error as a function of the number of sub-apertures. For Hartman-Schack sensors, this error grows logarithmically, whereas for curvature measurements it grows linearly. Thus, for a large number of sub-apertures, Hartman-Schack sensors are clearly favorable.

Finally, the two methods handle scintillations differently. For Hartman-Schack sensors, scintillation effects are a genuine problem. Curvature sensors, however, alleviate the problem of scintillation since the curvature is derived from the difference of intensities on two planes that are symmetrical with respect to the focal plane of a lens so that the scintillation effects tend to cancel out.

Because the two known techniques of determining wave front sensing have advantages and disadvantages in different areas as described above, a wave front sensing technique that employs both types of techniques would benefit from their advantages, and the disadvantages would be minimized. It is therefore an object of the present invention to provide such a wave front sensing system.

SUMMARY OF THE INVENTION

In accordance with the teachings of the present invention, a hybrid curvature/tilt wave front sensor is disclosed that determines both tilt measurements and curvature measurements of the wave front of a light beam. The light beam is split into a first path and a second path. The light beam on the first path is directed to a tilt sensor employing a lenslet array having a plurality of lenses. The lenses focus separate portions of the wave front onto a charged coupled device (CCD) that provides local intensity measurements. These are used by a computer to infer tilt measurements.

The light beam on the second path is directed to a curvature sensor that includes a pair of CCDs positioned at the same distance before and after the focal plane of a lens. The intensity measurement of the beam at these locations is sent to the computer which generates curvature measurements of the beam wave front. Algorithms are employed in the computer to determine the wave front phase based on the tilt and curvature measurements.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a wave front sensor is merely exemplary in nature, and is in no way intended to limit the invention or its applications or uses.

Figure 1:
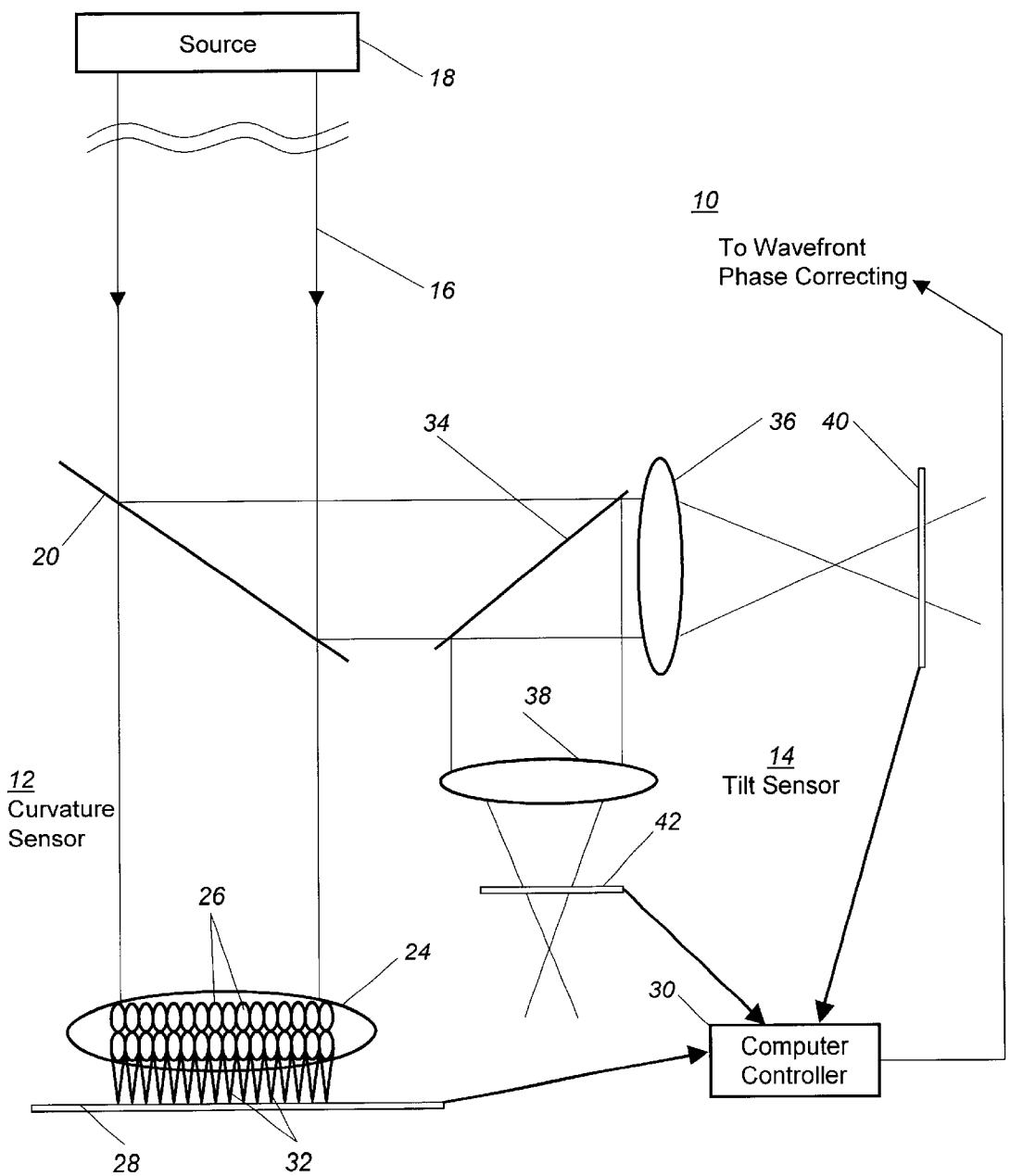
FIG. 1 is a schematic block diagram of a hybrid curvature/tilt wave front sensor, according to a first embodiment of the present invention.

FIG. 1 is a schematic block diagram of a wave front sensor 10 that employs a combination of a tilt sensor 12 and a curvature sensor 14. A collimated light beam 16 from an optical source 18, such as a star, is directed to a beam splitter 20 that splits the beam 16 into a first path and a second path. The light beam 16 from the first path is directed to a lenslet array 24 that includes a plurality of individual lenses 26. The lenses 26 separately focus different portions 32 of the beam 16 to generate the tilt of the beam 16 at several locations across the wave front.

A CCD camera 28 is positioned in the focal plane of the array 24 and provides electrical intensities of the different portions 32 of the wave front of the beam 16. The intensity measurements from the CCD camera 28 give an indication of where the individual beam portions 32 are focused relative to the orientation of the lenses 26 to the camera 28. The use of the CCD camera 28 is by way of a non-limiting example in that any other suitable optical detector consistent within the discussion herein can be employed.

This intensity information is sent to a computer controller 30 where the tilt of the wave front of the beam 16 can be inferred from the location of the intensity centroids in the beam 16. The tilt sensor 12, as described herein so far, is known as a Hartman-Schack type sensor, and the algorithms employed to generate the tilt measurement of the wave front of the beam 16 from the electrical representations of the tilt are known.

The portion of the beam 16 travelling on the second path is directed to a second beam splitter 34 that splits the split beam 16 into two paths in the curvature sensor 14. One path is directed to a lens 36 and the other path is directed to a lens 38. The lenses 36 and 38 are identical in this embodiment. A CCD camera 40 is positioned on one side of the focal plane of the lens 36 and a CCD camera 42 is positioned on the other side of the focal plane of the lens 38. The cameras 40 and 42 are symmetrically positioned in that they are the same distance from the focal plane of the lenses 36 and 38. The cameras 40 and 42 give intensity measurements of the beam 16 at two locations relative to the focal plane of the lenses 36 and 38, where one location is a distance (−d) before the focal plane of the lens 36 and the other location is a distance (+d) after the focal plane of the lens 38. The curvature data is then derived from the differences in intensity between two focal planes. The technique of generating the curvature of the wave front of the beam 16 in this manner is also well known in the art.

The computer controller 30 receives the electrical information from the CCD cameras 40 and 42 to give the intensity measurements. Once the intensity measurements are made, the curvature data is computed by the following formula:

$$curvature = \frac{Intensity(-d) - Intensity(+d)}{Intensity(-d) + Intensity(+d)}$$

Once the tilt and curvature data have been obtained in the computer 30, a software algorithm is used to reconstruct the phase of the wave front of the beam 16. The computer controller 30 separately determines the tilt measurement and the curvature measurement of the wave front of the beam 16. Because the tilt and curvature measurements arise from the same function, there should be coherence between the two measurements allowing the computer controller 30 to use the best phase reconstruction of the wave front between the tilt and curvature measurements. In other words, the algorithms used in the computers controller 30 can select either the tilt measurements or the curvature measurements for different areas in the beam wave front to negate the effects of scintillation or noise. For example, it would be unlikely that there would exist scintillation at both the focal plane of the lenslet array 24, and at the focal plane of the lenses 36 and 38.

The algorithm seeks to minimize the misfit between the tilt and curvature data and their computed values. One skilled in the art would be aware of conventional algorithms used for this purpose in wave front sensing. The most common techniques include tilt reconstructor and curvature sensing algorithms. Tilt reconstructors only use tilt data and then seek to minimize the tilt misfit. The classical curvature algorithms solve directly for the phase using only curvature data. The present invention also includes an algorithm that seeks the best model of a least squares fit from the tilt and curvature algorithms, and therefore is better suited to eliminate noisy and corrupted data.

Because the known algorithms for determining wave front sensing based on tilt measurements and on curvature measurements have coherence in the fact that they are trying to recover the same function, the computer controller 30 is able to more accurately determine the phase of the beam 16 by benefiting from the advantages of both the tilt measurements and the curvature measurements.

Figure 2:
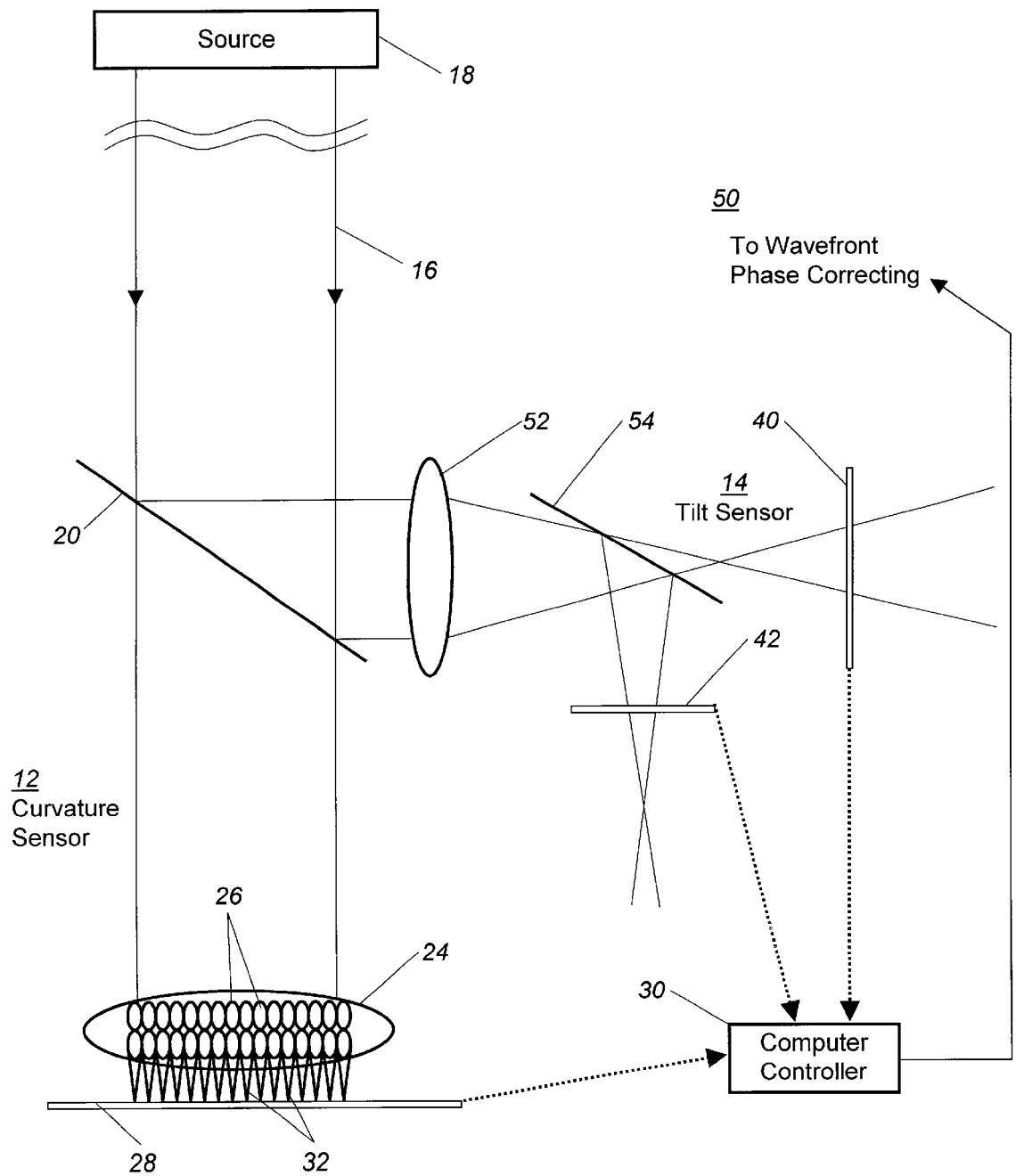
FIG. 2 is a schematic block diagram of a hybrid curvature tilt wave front sensor, according to another embodiment of the present invention.

FIG. 2 is a schematic block diagram of a wave front sensor 50, according to another embodiment of the present invention. The wave front sensor 50 is a variation of the wave front sensor 10, and therefore like components are labeled with the same reference. In this number embodiment, the lenses 36 and 38 have been eliminated, and a single lens 52 is provided between the beam splitter 20 and a beam splitter 54. The CCD cameras 40 and 42 are positioned at the same locations of +d and −d relative to the focal plane of the lens 52, and thus the same intensity sensing is achieved. In the second design, it is not necessary to employ the identical lenses 36 and 38. Therefore, performance problems that may be provided by aberrations that may independently exist in one of the lenses 36 or 38 is eliminated.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. A wave front sensing system for determining the phase of the wave front of an optical beam, said system comprising:
 a tilt sensor being responsive to the optical beam and determining a tilt measurement of the wave front, said tilt sensor generating a signal indicative of the tilt of the wave front;
 a curvature sensor being responsive to the optical beam and determining a curvature measurement of the wave front, said curvature sensor generating a signal indicative of the curvature of the wave front; and
 a controller being responsive to both the signals from the tilt sensor and the curvature sensor and combining the signals to construct the phase of the wave front.

2. The system according to claim 1 wherein the tilt sensor is a Hartmann-Schack sensor.

3. The system according to claim 1 wherein the tilt sensor includes a lenslet array and an optical detector, said lenslet array receiving the beam and separately focussing a plurality of portions of the wave front, said optical detector being positioned in the focal plane of the lenslet array and providing separate electrical signals of the intensity of the plurality of portions of the wave front at different locations.

4. The system according to claim 1 wherein the curvature sensor includes an optical lens and first and second optical detectors, said first optical detector being positioned on one side of the focal plane of the lens and the second optical detector being positioned on the other side of the focal plane of the lens.

5. The system according to claim 4 wherein the controller determines the curvature of the wave front by:

$$curvature = \frac{Intensity(-d) - Intensity(+d)}{Intensity(-d) + Intensity(+d)}$$

where d is the distance of the first and second optical detector from the focal plane of the lens.

6. The system according to claim 4 wherein the curvature sensor includes a beam splitter positioned between the lens and the first and second optical detectors, said beam splitter splitting the beam after it is focussed by the lens to impinge both the first and second detectors.

7. The system according to claim 4 wherein the first and second optical detectors are positioned equidistant from the focal plane of the lens.

8. The system according to claim 1 wherein the curvature sensor includes first and second optical lenses and first and second optical detectors, said first optical detector being positioned on one side of the focal plane of the first optical lens and the second optical detector being positioned on the other side of the focal plane of the lens.

9. The system according to claim 8 wherein the first optical detector is positioned the same distance from the focal plane of the first lens as the second optical detector is positioned from the focal plane of the second lens.

10. The system according to claim 1 wherein the controller includes a tilt measurement algorithm that determines the tilt of the wave front and a curvature measurement algorithm that determines the curvature of the wave front, and wherein the controller includes a least squares fit algorithm that determines the best model from the tilt determination and the curvature determination.

11. A wave front sensing system for determining the phase of the wave front of an optical beam, said system comprising:

a tilt sensor being responsive to the optical beam and determining a tilt measurement of the wave front, said tilt sensor generating a signal indicative of the tilt of the wave front, wherein the tilt sensor includes a lenslet array and an optical detector, said lenslet array receiving the beam and separately focussing a plurality of portions of the wave front, said optical detector being positioned in the focal plane of the lenslet array and providing electrical signals of the intensity of the plurality of portions of the wave front at different locations;

a curvature sensor being responsive to the optical beam and determining a curvature measurement of the wave front, said curvature sensor generating a signal indicative of the curvature of the wave front, wherein the curvature sensor includes an optical lens and first and second optical detectors, said first optical detector being positioned on one side of the focal plane of the lens and the second optical detector being positioned on the other side of the focal plane of the lens; and a controller being responsive to the signals from the tilt sensor and the curvature sensor and combining the signals to construct the phase of the wave front, wherein the controller includes a tilt measurement algorithm that determines the tilt of the wave front and a curvature measurement algorithm that determines the curvature of the wave front, and wherein the controller includes a least squares fit algorithm that determines the best model from the tilt determination and the curvature determination.

12. The system according to claim 11 wherein the controller determines the curvature of the wave front by:

$$curvature = \frac{Intensity(-d) - Intensity(+d)}{Intensity(-d) + Intensity(+d)}$$

where d is the distance of the first and second optical detector from the focal plane of the lens.

13. The system according to claim 11 wherein the curvature sensor includes a beam splitter positioned between the lens and the first and second optical detectors, said beam splitter splitting the beam after it is focussed by the lens to impinge both the first and second detectors.

14. The system according to claim 11 wherein the first and second optical detectors are positioned equidistant from the focal plane of the lens.

15. The system according to claim 11 wherein the optical detectors are CCD cameras.

16. A method of determining the phase of the wave front of an optical beam, said method comprising the steps of:

determining a tilt measurement of the wave front of the beam;

determining a curvature measurement of the wave front of the beam; and combining the tilt measurement and the curvature measurement to construct the phase of the wave front of the beam.

17. The method according to claim 16 wherein the step of combining includes the steps of using a tilt measurement algorithm to determine the tilt of the wave front and a curvature measurement algorithm to determine the curvature of the wave front, and using a least squares fit algorithm that determines the best model from the tilt determination and the curvature determination.

18. The method according to claim 16 wherein the step of determining the tilt measurement includes using a lenslet array and an optical detector.

19. The method according to claim 16 wherein the step of determining the curvature measurement includes using at least one lens and first and second optical detectors positioned equidistant at opposite sides of the focal plane of the at least one lens.

20. The method according to claim 19 wherein the step of determining the curvature measurement includes using the formula:

$$curvature = \frac{Intensity(-d) - Intensity(+d)}{Intensity(-d) + Intensity(+d)}$$

where d is the distance the first and second optical detectors are from the focal plane of the lens.

\* \* \* \* \*